US012541546B2

(12) United States Patent
Andrew et al.

(10) Patent No.: US 12,541,546 B2
(45) Date of Patent: Feb. 3, 2026

(54) LOSSLESS SUMMARIZATION

(71) Applicant: Salesforce, Inc., San Francisco, CA (US)

(72) Inventors: Eli Andrew, Palo Alto, CA (US); Noah Burbank, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/865,748

(22) Filed: Jul. 15, 2022

(65) Prior Publication Data

US 2024/0020327 A1 Jan. 18, 2024

(51) Int. Cl.
*G06F 16/34* (2019.01)
*G06F 16/31* (2019.01)

(52) U.S. Cl.
CPC .......... *G06F 16/345* (2019.01); *G06F 16/313* (2019.01)

(58) Field of Classification Search
CPC .............................. G06F 16/345; G06F 16/313
USPC ....................................................... 715/254
See application file for complete search history.

(56) References Cited

U.S. PATENT DOCUMENTS

| | | | | |
|---|---|---|---|---|
| 11,580,145 | B1* | 2/2023 | Kumar | G06N 3/092 |
| 2018/0129938 | A1* | 5/2018 | Xiong | G06N 3/044 |
| 2021/0286951 | A1* | 9/2021 | Song | G06N 3/047 |
| 2021/0390127 | A1* | 12/2021 | Fox | G06F 40/289 |
| 2023/0103617 | A1* | 4/2023 | Choi | G06Q 50/40 |
| | | | | 434/350 |

OTHER PUBLICATIONS

Iman (Improvements to the Complex Question Answering Models, published 2005, pp. 1-137) (Year: 2005).*
Stiennon et al. (Learning to summarize from human feedback, published 2020, pp. 1-14) (Year: 2020).*
Chen et al. (A Semantic QA-Based Approach for Text Summarization Evaluation, published 2018, pp. 1-8) (Year: 2018).*
Azmi et al. (An abstractive Arabic text summarizer with user controlled granularity, published 2018, pp. 1-19) (Year: 2018).*
Azmi et al. (Ikhtasir—A User Selected Compression Ratio Arabic Text Summarization System, published 2009, pp. 1-7) (Year: 2009).*
Chen et al. (A Semantic QA-Based Approach for Text Summarization Evaluation, pp. 1-8) (Year: 2018).*
Stiennon et al. (Learning to summarize from human feedback, pp. 1-14) (Year: 2020).*

* cited by examiner

*Primary Examiner* — Mohammed H Zuberi
*Assistant Examiner* — Ahamed I Nazar
(74) *Attorney, Agent, or Firm* — Butzel Long

(57) ABSTRACT

Systems, devices, and techniques are disclosed for lossless summarization. Data that including indications of whether a text summary generated by a machine learning system from an input document includes correct answers to questions about the input document may be received. Weights associated with the questions about the input document may be received. A first vector may be generated from the indications in the data. A second vector may be generated from the weights. A dot product of the first vector and the second vector may be determined. A ratio of a word count of the text summary to the word count of the input document may be determined. A score for the text summary based on the dot product and the ratio may be determined. The machine learning system may be adjusted based on the score.

20 Claims, 11 Drawing Sheets

LOSSLESS SUMMARIZATION

BACKGROUND

Automatically generating useful, high quality text summaries from input documents requires that the generated text summaries be evaluated so that the system that generates the text summaries can be improved, often through training of a machine learning system. To train machine learning systems to generate text summaries of input documents, text summaries output by a machine learning system for given input documents are compared to human-generated text summaries for those input documents. The text summaries output by the machine learning system are then scored based on how close they are to the human-generated text summaries. These scores may then be used as feedback to adjust the machine learning system. Training machine learning systems to generate text summaries in this manner may result in the machine learning system generating text summaries that are similar to human generated text summaries, by may not actually result the generated text summaries being more useful or of higher quality. Additionally, obtaining human generated text summaries to use for training may be burdensome, and the obtained text summaries may be highly subjective and vary greatly in writing styles found present in business communications across industries, locations, and scales.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
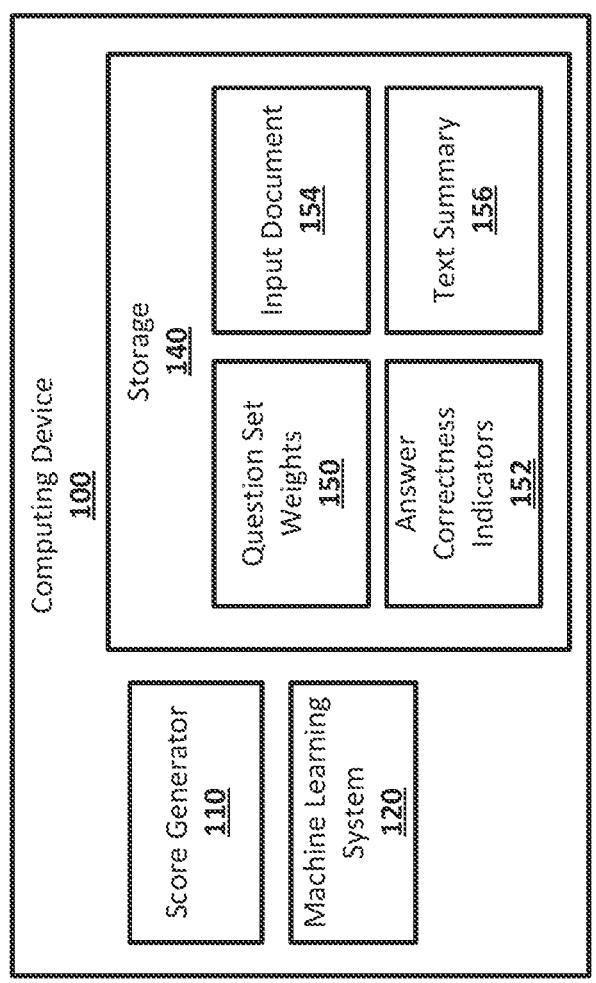
FIG. 1 shows an example system suitable for lossless summarization according to an implementation of the disclosed subject matter.

Techniques disclosed herein enable lossless summarization, which may allow for machine learning systems to be trained to generate text summaries of input documents that may be useful for answering questions about the input document that was summarized. Data that includes indications of whether a text summary generated by a machine learning system from an input document includes correct answers to questions about the input document may be received. Weights associated with the questions about the input document may be received. A first vector may be generated from the indications in the data. A second vector may be generated from the weights. A dot product of the first vector and the second vector may be determined. A ratio of a word count of the text summary to the word count of the input document may be determined. A score may be generated for the text summary based on the dot product and the ratio. The machine learning system may be adjusted based on the score.

Data that includes indications of whether a text summary generated by a machine learning system from an input document includes correct answers to questions about the input document may be received. A machine learning system may be used to generate a text summary of an input document. The input document may be any document that includes text, including, for example, human-written documents and documents generated through any suitable form of speech-to-text transcription of any audio suitable audio recording. The machine learning system may be any suitable machine learning system, including, for example, neural network, statistical, and heuristic machine learning systems, using any suitable training mechanism or loss function. The machine learning system may have already undergone any amount of previous training.

The input document may be input to the machine learning system, which may output a text summary of the input document that may be used to answer questions about the contents of the input document. A question set may include any suitable number of questions. The questions in a question set may be machine generated, for example, by a different machine learning system, or may be human generated. The questions may be questions that should be answerable using only information from the input document but may be generated without regard for the domain of the input document. Questions in a question set may not overlap. The questions may be assigned weights based on the domain of the input document, as the weight assigned to a question may be based on the importance within the domain of the input document of being able to answer that question based on the text summary. The weights for questions in a question set may be initially assigned in any suitable manner, including, for example randomly, by a domain expert, or based on topic labels assigned to the questions and a weight scheme organized around the topic labels. A single machine learning system may be associated with a single question set, and each text summary output by the machine learning system from each input document may be used to answer the questions from that single question set. Different machine learning systems may have different question sets.

An attempt to answer the questions in the question set may be made using the text summary. The attempt to answer the questions about the input document may be made in any suitable manner, including, for example, by a human review or by a computerized system, including, for example, a machine learning system. The attempt to answer the questions in the questions set may only rely on the text summary and may not reference the input document from which the text summary was generated.

Each question in the questions set may be assigned a binary value that indicates whether the question was successfully answered using the text summary. For example, a question that was successfully answered may be assigned a value of "1" while a question that was not successfully answered may be assigned a value of "0". Whether the questions in the questions set were successfully answered using the text summary may be determined in any suitable manner. For example, a human may review the answers to the questions and determine if the answers to the questions are correct, or an automated system, for example, a machine learning system or other computerized model may be used to evaluate the answers to the questions. In some implementations, the questions in the question set may be answered separately using the input document, and whether a question was successfully answered using the text summary may be determined by comparing the answers generated using the text summary to the answers generated using the input document. A question may be considered to have been successfully answered using the text summary if the answer generated using the text summary matches the answer generated using the input document. The binary values may be used as the data that includes indications of whether the text summary generated by the machine learning system from the input document includes correct answers to the questions about the input document, and may be received at any suitable computing device, including, for example, the computing device that hosts the machine learning system.

Weights associated with the questions about the input document may be received. The weights associated with the questions in the question set may be received at the computing device that received the data that includes indications of whether the text summary generated by the machine learning system from the input document includes correct answers to the questions about the input document.

A first vector may be generated from the indications in the data. For example, the binary values in the received data may be used to generate a vector that may include a cell for each question in the question set, with the binary value for each question used as the value for each cell. The binary values may appear in the vector in the order of the questions of the question set that the binary values were generated for. For example, the first cell in the vector may include the binary value that indicates whether the first question in the question set was correctly answered using the text summary.

A second vector may be generated from the weights. For example, the weights may be used to generate a vector that may include a cell for each question in the question set, with the weight for each question used as the value for each cell. The weights may appear in the vector in the order of the questions of the question set that the binary values were generated for. For example, the first cell in the vector may include the weight that was assigned to the first question in the question set.

A dot product of the first vector and the second vector may be determined. For example, a dot product may be determined for the vector that includes the binary values from the received data and the vector that includes the received weights.

A ratio of a word count of the text summary to the word count of the input document may be determined. The ratio may be used to determine the brevity of the text summary of the input document as compared to the input document itself. The ratio may be determined by dividing the word count of text summary by the word count of the input document.

A score may be generated for the text summary based on the dot product and the ratio. The score may be generated in any suitable manner. For example, the score may be the sum of the dot product and brevity value. The brevity value may be, for example, the result of multiplying a brevity constant by one minus the ratio. The brevity constant may be a value between, for example, 0 and 1, that may indicate how important brevity is in evaluating the quality of the text summary. The resulting score may indicate the quality of the text summary based on how useful the text summary is for answering questions from the question set about the input document and how brief the text summary is compared to the input document. Higher quality text summaries may have high scores based on being able to correctly answer more, and more important, questions from the question set while being much shorter than the input document.

The machine learning system may be adjusted based on the score. The score may be used as feedback in the training of the machine learning system that generated the text summary from the input document. The score may be used to adjust the machine learning system in any suitable manner in accordance with any training algorithm or loss function used by the machine learning system. For example, if the machine learning system uses a neural network, the score may be used with backpropagation to adjust the weights of the neural network. A loss function may, for example, compare the score with the highest score that it is possible for a text summary to receive based on the weights and the brevity constant to determine how correct or incorrect the text summary is, and thus the loss in the machine learning system. This may train the machine learning system to generate text summaries that are useful in correctly answering the questions from the question set while being shorter than the input document. Any number of input documents may be used as input to the machine learning system in order to train the machine learning system. The same question set may generally be used with every text summary generated from every input document being used in the training of the machine learning system, although in some implementations the question set may be altered in any suitable manner during training as needed to improve the results of the training of the machine learning system.

A machine learning system may be trained on input documents from the same entity, for example, business, organization, or person. Once trained, that machine learning system may continue to be used to generate text summaries of input documents that originate from that same entity. Different entities may have different machine learning systems trained using input documents that originate from those entities. This may result in a machine learning system being trained to generate text summaries for input documents that originate with a specific entity, and for different entities to have their own corresponding machine learning system or systems to generate text summaries from their input documents.

In some implementations, the weights assigned to the questions of a question set for a machine learning system that generate text summaries may also be adjusted. For example, after the machine learning system is considered to be fully trained, for example, consistently generating text summaries that receive high scores, the text summaries generated by the machine learning system from novel input documents may be sent to a consumer of the text summaries. The consumer may be, for example, a business or organization for whom the machine learning system was trained. The consumer of the text summaries may provide feedback indicating whether they consider the text summaries to be of high quality. This feedback may be used to adjust the weights assigned to the question of the question sets. For example, if the consumer indicates that the text summaries are of lower quality than is indicated by the scores given to the text summaries, this may mean that the weights assigned to the questions need adjusting, as they may be overweighting questions that are less important to the consumer and/or underweighting questions that are more important to the consumer. The consumer may provide indications as to which questions from the question set need their weight changed or may only provide basic feedback that the weights need to be adjusted without identifying specific questions from the question set. The weights may be adjusted in any suitable manner, for example, using any suitable technique including, for example, hill-climbing or simulated annealing or any suitable statistical technique.

FIG. 1 shows an example system for lossless summarization according to an implementation of the disclosed subject matter. A computing device 100 may be any suitable computing device, such as, for example, a computer 20 as described in FIG. 7, or component thereof, for lossless summarization. The computing device 100 may include a score generator 110, a machine learning system 120, and a storage 140. The computing device 100 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. The computing device 100 may be part of a computing system and network infrastructure, or may be otherwise connected to the computing system and network infrastructure, including a larger server network which may include other server systems similar to the computing device 100. The computing device 100 may include any suitable combination of central processing units (CPUs), graphical processing units (GPUs), and tensor processing units (TPUs).

The score generator 110 may be any suitable combination of hardware and software of the computing device 100 for generating a score for a text summary generated from an input document by the machine learning system 120. For example, the machine learning system may generate a text summary 156 from an input document 154. The score generator 110 may generate a score for the text summary 156 based on, for example, question set weights 150, answer correctness indicators 152, and word counts of the input document 154 and the text summary 156. The score may be used, for example, to adjust the machine learning system 120 during training of the machine learning system 120 to generate text summaries such as the text summary 156 such that the text summaries are closer to lossless with regards to information in the input document, such as the input document 154, being summarized while still being briefer than the input document.

The machine learning system 120 may be any suitable combination of hardware and software for implementing a machine learning system that may be trained, and used, to generate text summaries from input documents. The machine learning system 120 may include, for example, recurrent neural networks, Bayesian classifiers, support vector machines, and ensemble classification trees. The machine learning system 120 may use any form of supervised learning and any form of training or loss function, such as, for example, backpropagation for recurrent neural networks. The machine learning system 120 may be trained, for example, using scores generated by the score generator 110 for text summaries generated by the machine learning system 120, such as the text summary 156.

The storage 140 may be any suitable combination of hardware and software for storing data. The storage 140 may include any suitable combination of volatile and non-volatile storage hardware, and may include components of the computing device 100 and hardware accessible to the computing device 100, for example, through wired and wireless direct or network connections. The storage 140 may store, for example, the question set weights 150, the answer correctness indicators 152, the input document 154, and the text summary 156. The question set weights 150 may be weights for questions of a question set that is used in the training of the machine learning system 120. The questions set weights 150 may be stored in any suitable format, and may be any suitable values, for example, values between 0 and 1. In some implementations, the question set weights 150 may be normalized so that, for example, the sum of all of the weights in the questions set weights 150 is one. The answer correctness indicators 152 may be indicators of whether the questions from the question set were answered correctly or incorrectly using the text summary 156. The input document 154 may be a document that includes text of any suitable type that may have been input to the machine learning system 120 to generate the text summary 156. The text summary 156 may be text generated by the machine learning system 120 to summarize the input document 154.

Figure 2A:
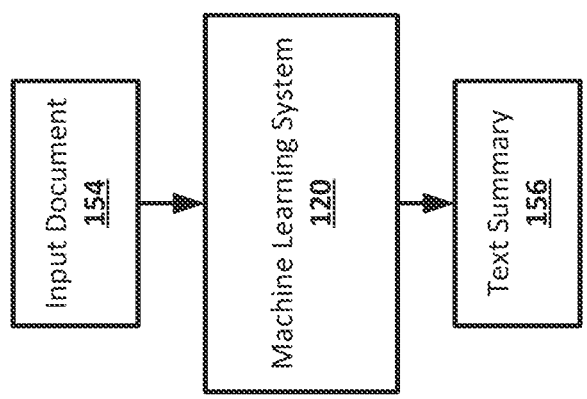
FIG. 2A shows an example arrangement suitable for lossless summarization according to an implementation of the disclosed subject matter.

FIG. 2A shows an example arrangement suitable for lossless summarization according to an implementation of the disclosed subject matter. The machine learning system 120 may receive as input the input document 154. The input document 154 may be received from any suitable source and may include any suitable text. The machine learning system 120 may output the text summary 156, which may be a summarization of the text of the input document 154.

Figure 2B:
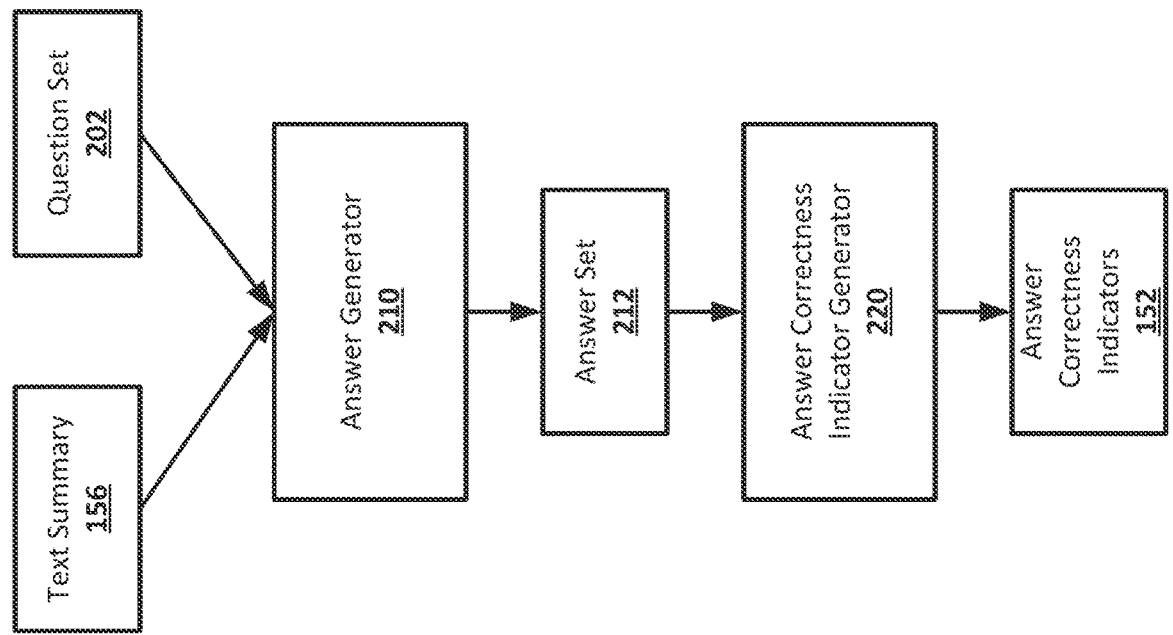
FIG. 2B shows an example arrangement suitable for lossless summarization according to an implementation of the disclosed subject matter.

FIG. 2B shows an example arrangement suitable for lossless summarization according to an implementation of the disclosed subject matter. The text summary 156 and a question set 202 may be input to an answer generator 210. The question set 202 may include a set of questions that may be used to evaluate text summaries, such as the text summary 156, generated by the machine learning system 120. The questions in the question set 202 may be correctly answerable using information in the input document 154. The answer generator 210 may be used to attempt to answer the questions in the question set 202 using the text summary 156 without using the input document 154 and may include or use any suitable combination of hardware, software, and user interaction. The answer generator 210 may, for example, be an application running on the computing device 100, or another computing device, that may use user interaction, another machine learning system, or other automated system to attempt to answer the questions from the question set 202 using the text summary 156. The answers generated by the answer generator 210 for the questions from the question set 202 may be output as the answer set 212, which may include the answers in any suitable format, including as human readable text.

The answer set 212 may be used as input to an answer correctness indicator generator 220. The answer correctness indicator generator 220 may be used to determine whether the answers in the answer set 212 correctly answer the questions in the question set 202 and to generate indicators based on which answers are correct and incorrect. The answer corrected indicator generator 220 may include or use any suitable combination of hardware, software, and user interaction. The answer correctness indicator generator 220 may, for example, be an application running on the computing device 100, or another computing device, that may use user interaction, another machine learning system, or other automated system to determine whether the answers in the answer set 212 correctly answer the questions in the question set 202. The answer correctness indicator generator 220 may determine whether the answers in the answer set 212 correctly answer the questions in the question set 202 in any suitable manner, including, for example, through comparison of the answer set 212 to a previously prepared set of correct answers, or through comparison of the answer set 212 against a set of answers generated by the answer generator 210 using the input document 154 as input along with the question set 202. Each answer in the answer set 212 may correspond to a single question from the question from the question set 202, and for each answer an indicator may be generated based on whether the answer is correct or not. For example, the indicators generated by the answer correctness indicator generator 220 may be binary values, with answer that are incorrect being assigned an indicator of '0' and answers that are correct being assigned an indicator of '1'. These indicators may be output by the answer correctness indicator generator 220 as the answer correctness indicators 152.

Figure 2C:
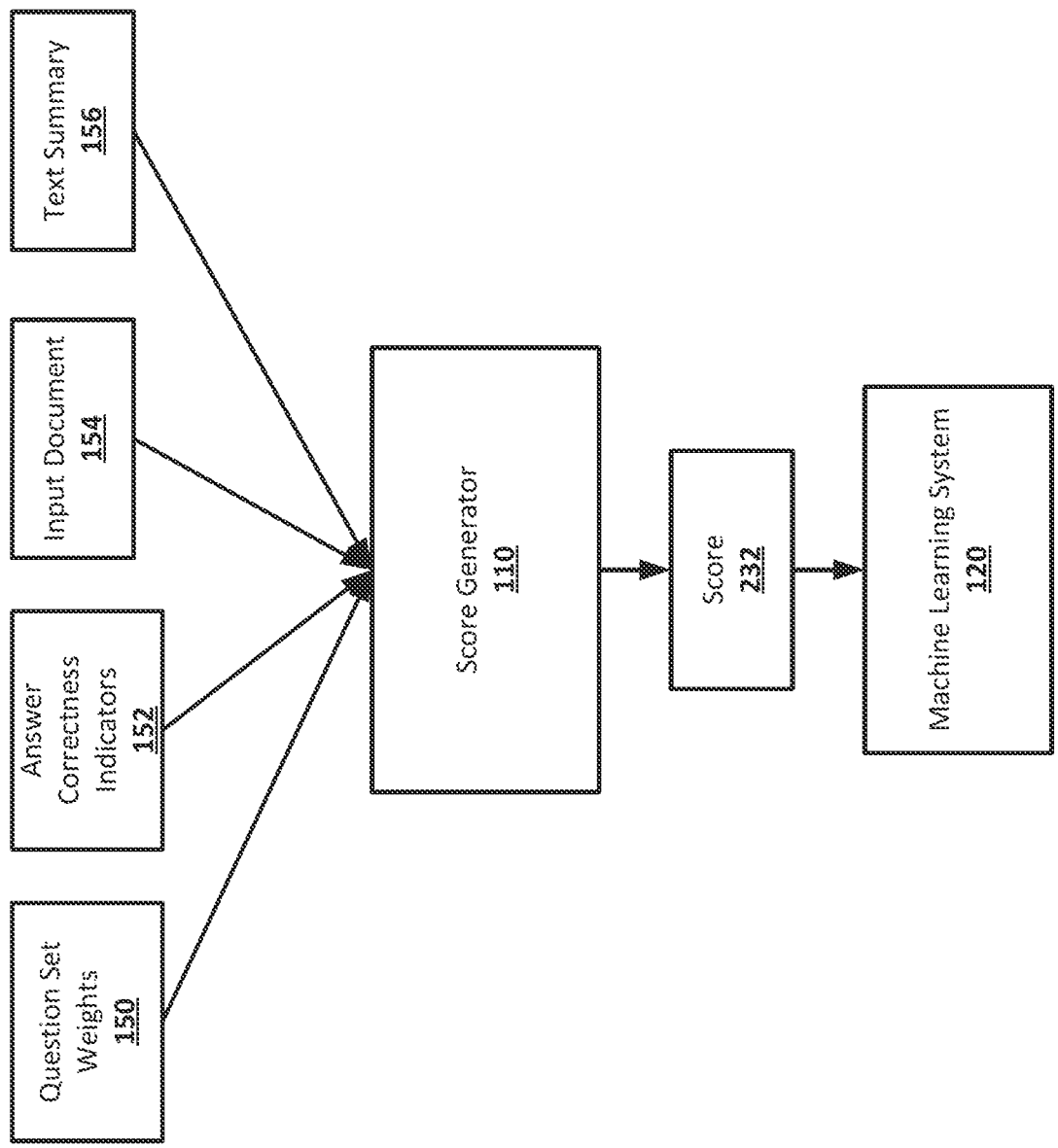
FIG. 2C shows an example arrangement suitable for lossless summarization according to an implementation of the disclosed subject matter.

FIG. 2C shows an example arrangement suitable for lossless summarization according to an implementation of the disclosed subject matter. The question set weights 150, the answer correctness indicators 152, the input document 154, and the text summary 156 may all be input to the score generator 110, which may generate a score 232. The score 232 may be a score that indicates that quality of the text summary 156 based on whether the text summary 156 is usable so answer questions from the question set 202 and how brief the text summary 156 is when compared to the input document 154. The score generator 110 may, for example, generate a first vector using the answer correctness indicators 152 and a second vector using the question set weights 150, and then determine the dot product of the first vector and the second vector. The score generator 110 may determine the word counts of the input document 154 and the text summary 156 and may determine the ratio of the word count of the text summary 156 to the word count of the input document 154. The score generator 110 may then subtract the ratio from one and multiply by a brevity constant, and then add the result to the dot product of the first vector and the second vector, generating a value that may be used as, or as a basis for, the score 232. For example, the value generated by the score generator 110 may be output raw as the score 232, or may be used to determine a percentage, for example, by dividing the value by a maximum possible value based on the question set weights 150 and the brevity constant.

The score 232 may be used to adjust the machine learning system 120. The machine learning system 120 may use any suitable learning mechanism with any suitable training or loss function. For example, the machine learning system 120 may include a neural network and may use backpropagation to adjust the weights of the neural network during training of the machine learning system 120. The score 232 may, for example, be used as input to the loss function used by the machine learning system 120, which may then adjust machine learning system 120 in accordance with the quality level of the text summary 156 as indicated by the score 232. This may train the machine learning system 120 to generate, from input documents, text summaries that are usable to answer more, and more important, questions from the question set 202 and include fewer words relative to the input documents. The machine learning system 120 may be trained using any number of input documents. For example, the machine learning system 120 may be trained until it generates text summaries that receive scores above some threshold across an entire set of input documents. The same question set 202 may be used along with each input document, although in some implementations the question set 202 may be changed, for example, adding, removing, or altering questions, during training of the machine learning system 120, for example, to change the direction of the training of the machine learning system 120.

Figure 3:
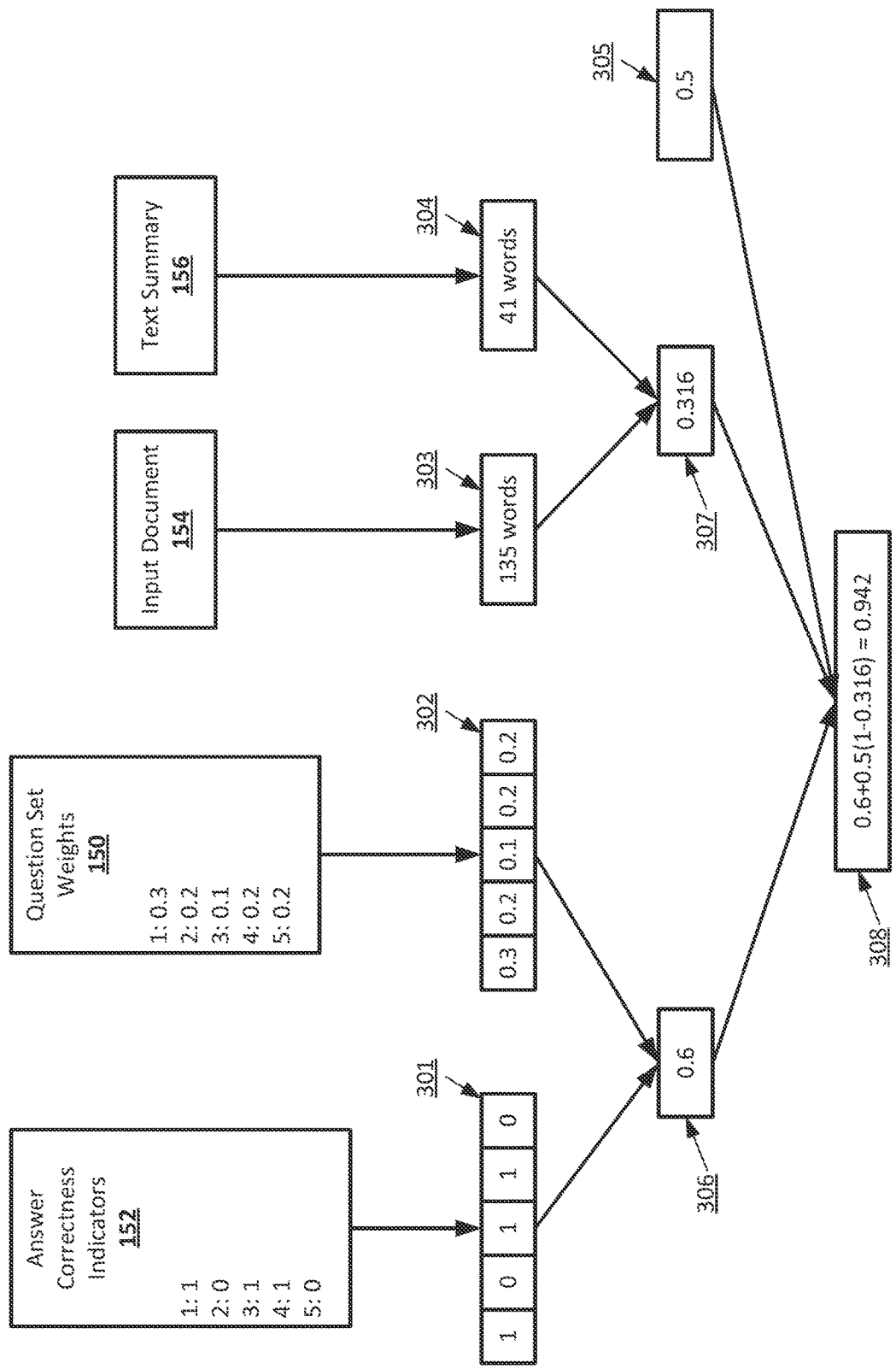
FIG. 3 shows an example arrangement suitable for lossless summarization according to an implementation of the disclosed subject matter.

FIG. 3 shows an example arrangement suitable for lossless summarization according to an implementation of the disclosed subject matter. The score generator 110 may generate a first vector 301 from the answer correctness indicators 152. The question set 202 may include five questions so the answer set 212 may include five answers, resulting in five indicators in the answer correctness indicators 152. For example, the answers in the answer set 212 to the first, third, and fourth questions from the question set 212 may have been correct and the answers to the second and fifth questions may have been incorrect. The score generator 110 may generate a second vector 302 from the question set weights 150, which may include a single value as a weight for each of the five questions in the question set 202. The score generator 110 may generate a first word count 303 by counting the words in the input document 154 and a second word count 304 by counting the words in the text summary 156. The score generator may determine a dot product 306 as the dot product of the first vector 301 and the second vector 302. The score generator 110 may determine a ratio 307 as the ratio of the second word count 304 to the first word count 303. The score generator may then determine a score 232 for the text summary 156 by subtracting the ratio 307 from one, multiplying the result by a brevity constant 305, and adding the dot product 306. For example, the score 232 for the text summary 156 may be 0.942. In some implementations, the score may be represented as a percentage of the highest possible score a text summary can receive based on the question set weights 150 and the brevity constant 305. For example, the maximum score may be 1.5, and the percentage score for the text summary 156 may be 0.628. The brevity constant 305 may be a constant or weight set in any suitable manner that may indicate the importance of brevity in the text summaries generated by the machine learning system 120. The brevity constant 305 may be any suitable value.

Figure 4A:
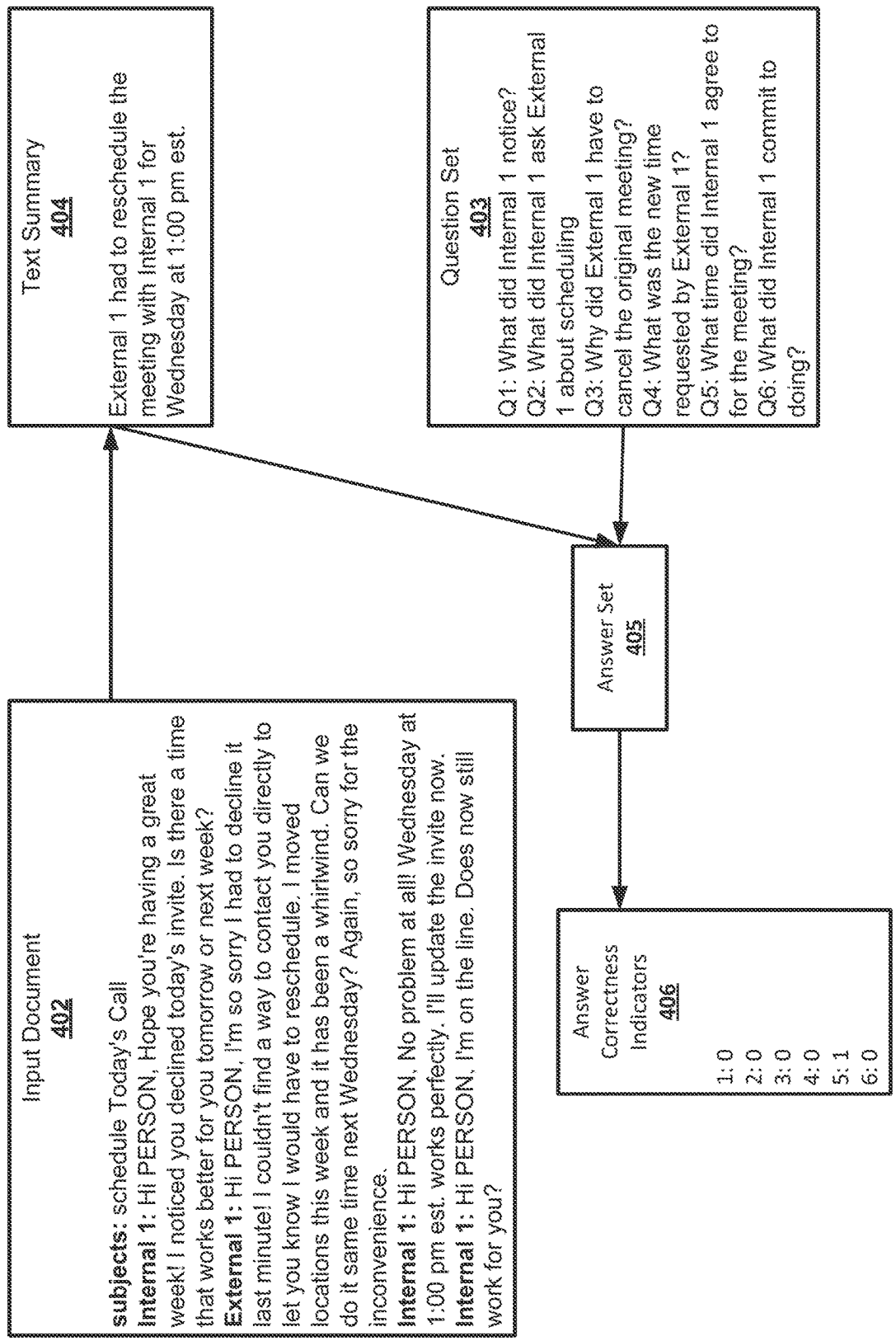
FIG. 4A shows an example arrangement suitable for lossless summarization according to an implementation of the disclosed subject matter.

FIG. 4A shows an example arrangement suitable for lossless summarization according to an implementation of the disclosed subject matter. Input document 402 may include text from an email exchange. Text summary 404 may be a summary of the input document 402 generated by inputting the input document 402 to a machine learning system, such as the machine learning system 120. Question set 403 may include questions that may be used to evaluate text summaries, such as the text summary 414, generated by the machine learning system to which the input document 402 was input. Answer set 415 may be answers to the questions of the question set 403 generated from the text summary 404, for example, by the answer generator 210. Answer correctness indicators 406 may include indications, for example, as binary values, of whether the answers in the answer set 405 correctly answer their corresponding questions in the question set 403 as determined by, for example, the answer correctness indicator generator 220. The answer correctness indicators 406 may be used along with weights for the question set 403, for example, the question set weights 150, and the word counts of the input document 402 and the text summary 404, which may be, respectively, 116 and 16, to determine a score for the text summary 404. The score may then be used to adjust the machine learning system that generated the text summary 404, for example, the machine learning system 120. For example, if the weights for the question set 403 are 0.2, 0.1, 0.2, 0.1, 0.3, 0.1, and the brevity constant is 0.5, then the score for the text summary 404 may be 0.73 out of a possible 1.5, or 48.7 percent.

Figure 4B:
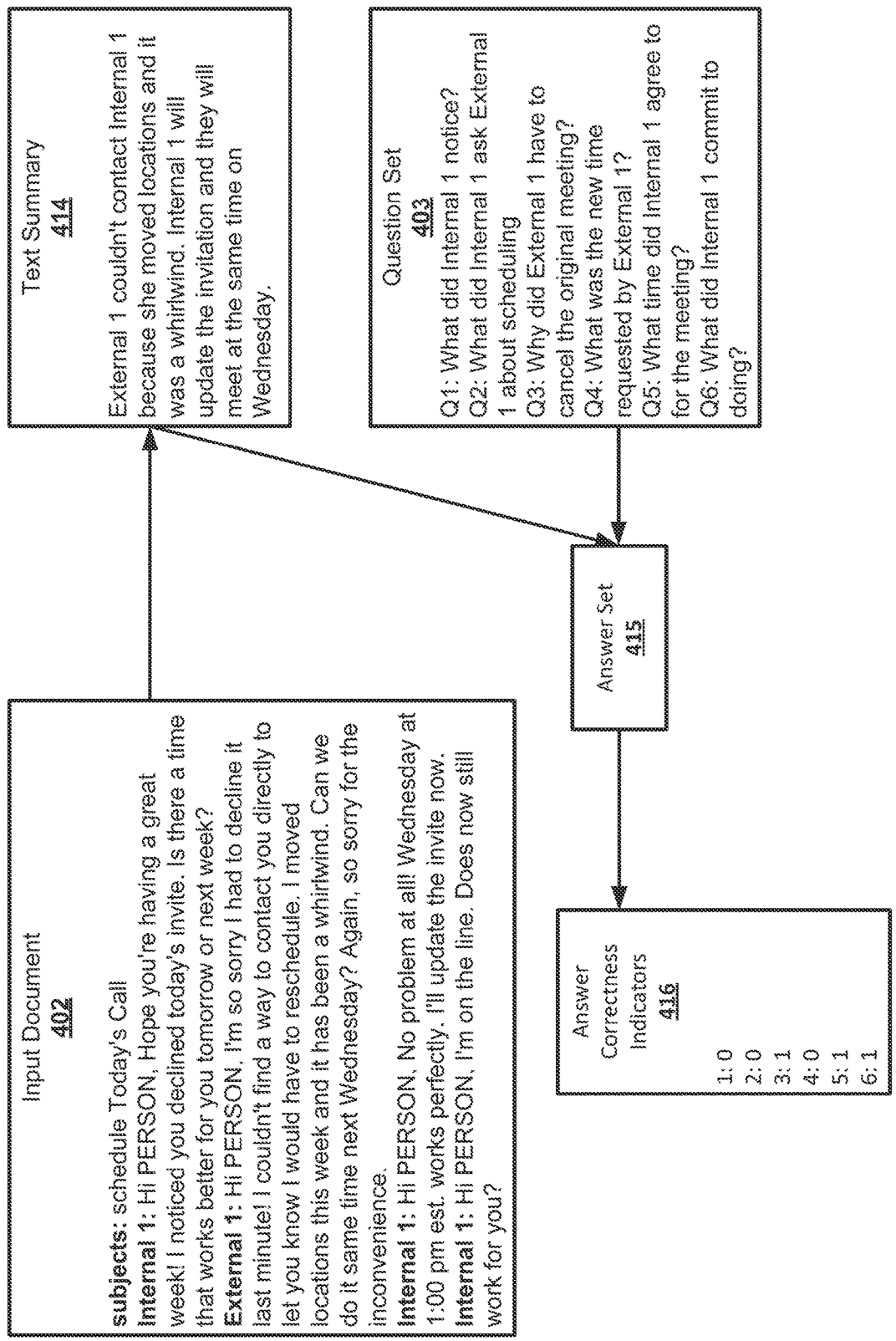
FIG. 4B shows an example arrangement suitable for lossless summarization according to an implementation of the disclosed subject matter.

FIG. 4B shows an example arrangement suitable for lossless summarization according to an implementation of the disclosed subject matter. Text summary 414 may be a summary of the input document 402 generated by inputting the input document 402 to a machine learning system, such as the machine learning system 120. Question set 403 may include questions that may be used to evaluate text summaries, such as the text summary 414, generated by the machine learning system to which the input document 402 was input. Answer set 415 may be answers to the questions of the question set 403 generated from the text summary 414, for example, by the answer generator 210. Answer correctness indicators 416 may include indications, for example, as binary values, of whether the answers in the answer set 405 correctly answer their corresponding questions in the question set 403 as determined by, for example, the answer correctness indicator generator 220. The answer correctness indicators 416 may be used along with weights for the question set 403, for example, the question set weights 150, and the word counts of the input document 402 and the text summary 414, which may be, respectively, 116 and 31, to determine a score for the text summary 414. The score may then be used to adjust the machine learning system that generated the text summary 404, for example, the machine learning system 120. For example, if the weights for the question set 403 are 0.2, 0.1, 0.2, 0.1, 0.1, and the brevity constant is 0.5, then the score for the text summary 414 may be 0.97 out of a possible 1.5, or 64.7 percent.

Figure 4C:
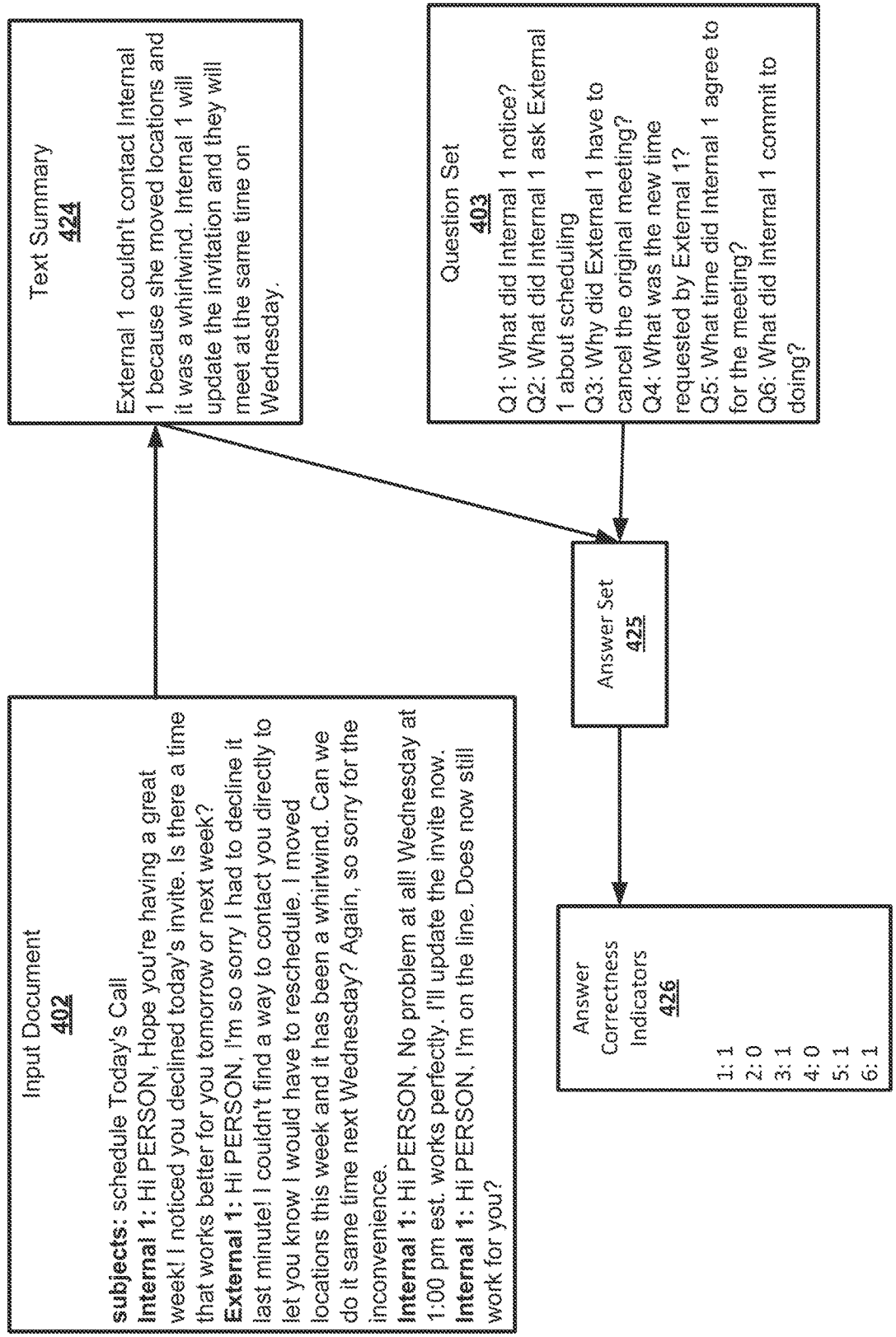
FIG. 4C shows an example arrangement suitable for lossless summarization according to an implementation of the disclosed subject matter.

FIG. 4C shows an example arrangement suitable for lossless summarization according to an implementation of the disclosed subject matter. Text summary 424 may be a summary of the input document 402 generated by inputting the input document 402 to a machine learning system, such as the machine learning system 120. Question set 403 may include questions that may be used to evaluate text summaries, such as the text summary 424, generated by the machine learning system to which the input document 402 was input. Answer set 425 may be answers to the questions of the question set 403 generated from the text summary 424, for example, by the answer generator 210. Answer correctness indicators 416 may include indications, for example, as binary values, of whether the answers in the answer set 405 correctly answer their corresponding questions in the question set 403 as determined by, for example, the answer correctness indicator generator 220. The answer correctness indicators 426 may be used along with weights for the question set 403, for example, the question set weights 150, and the word counts of the input document 402 and the text summary 424, which may be, respectively, 116 and 28, to determine a score for the text summary 424. The score may then be used to adjust the machine learning system that generated the text summary 404, for example, the machine learning system 120. For example, if the weights for the question set 403 are 0.2, 0.1, 0.2, 0.1, 0.1, and the brevity constant is 0.5, then the score for the text summary 424 may be 1.18 out of a possible 1.5, or 78.7 percent.

Figure 5:
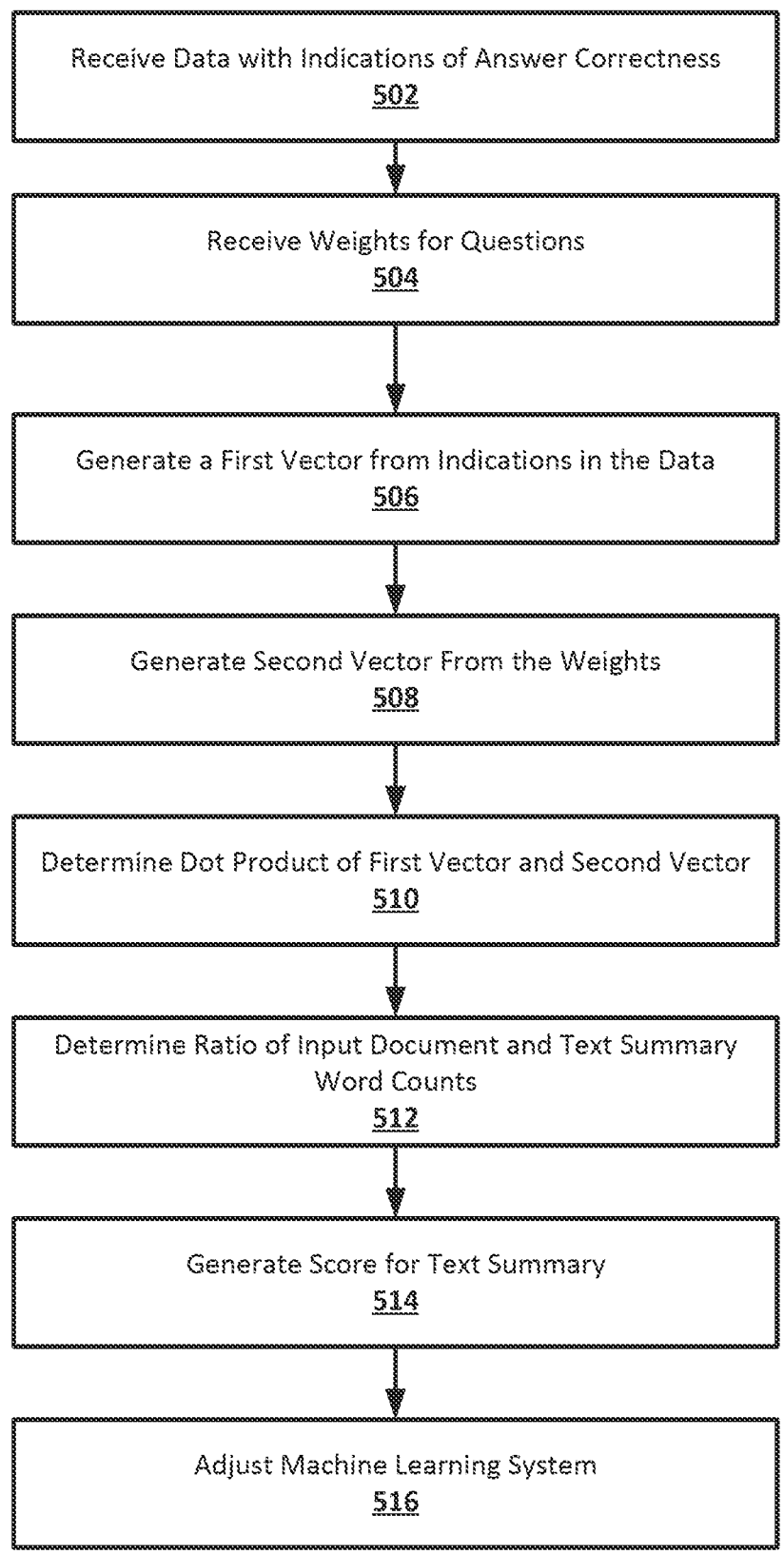
FIG. 5 shows an example procedure suitable for lossless summarization according to an implementation of the disclosed subject matter.

FIG. 5 shows an example procedure suitable for lossless summarization according to an implementation of the disclosed subject matter. At 502, data with indications of answer correctness may be received. For example, the score generator 110 on the computing device 100 may receive the answer correctness indicators 152, which may be data with indications of answer correctness. The answer correctness indicators 152 may have been received at the computing device 100 from any suitable source, including any other computing device or system, and may be stored in the storage 140, or may have been generated by the computing device 100. The answer correctness indicators 152 may have been generated by, for example, the answer correctness indicator 220 based on the answer set 212. The answer set 212 may have been generated by, for example, the answer generator 210 based on the question set 202 and the text summary 156, which may have been generated by inputting the input document 154 to the machine learning system 120. The answer correctness indicators 152 may, for example, be indications of whether questions from the question set 202 were correctly answerable using the text summary 156, and may be in any suitable format, such as a list of binary values with a single value for each question of the question set 202.

At 504, weights for questions may be received. For example, the score generator 110 on the computing device 100 may receive the question set weights 150. The question set weights 150 may have been received at the computing device 100 from any suitable source, including any other computing device or system, and may be stored in the storage 140, or may have been generated by or input by a user to the computing device 100. The question set weights 150 may include a weight for each question from the question set 202. Each weight may be a value, for example, between 0 and 1. The weights of the questions set weights 150 may be normalized, for example, may sum to 1.

At 506, a first vector may be generated from the indications in the data. For example, the score generator 110 on the computing device 100 may generate the first vector 301 from the answer correctness indicators 152. The first vector 301 may include the values that indicate whether the answers in the answer set 212 are correct answers to the questions from the question set 202, which may be, for example, binary values of either 0 or 1. The indications may be stored in the first vector 301 in the order of the questions to which they correspond.

At 508, a second vector may be generated from the weights. For example, the score generator 110 on the computing device 100 may generate the second vector 302 from the question set weights 150. The second vector 302 may include the values of the weights from the question set weights 150 which may be, for example, values between 0 and 1. The weights may be stored in the second vector 302 in the order of the questions to which they correspond.

At 510, a dot product of the first vector and the second vector may be determined. For example, the score generator 110 on the computing device 100 may perform a dot product operation on the first vector 301 and the second vector 302, resulting in the dot product 306.

At 512, a ratio of the input document and text summary word counts may be determined. For example, the score generator 110 on the computing device 100 may count the words in both the input document 154 and the text summary 156 to generate, respectively, the first word count 303 and the second word count 304. The score generator 110 may divide the second word count 304 into the first word count 303 to determine the ratio 307, which may be the ration of the word count of the text summary 156 to the word count of the input document 154.

At 514, a score for the text summary may be determined. For example, the score generator 110 on the computing device 100 may subtract the ratio 307 from one, multiply the result by a brevity constant, and then add the dot product 306, to determine the score 232 for the text summary 156 as a raw value. The score 232 may be represented in any suitable manner, including as the raw value determined by the score generator 110, or as a percentage determined by dividing the raw value into the maximum possible score as determined based on the question set weights 150 and the brevity constant. The score 232 may be an indication of the quality of the text summary 156 as determined based on the brevity of the text summary 156 and how well the text summary 156 can be used to answer questions about the input document 154.

At 516, a machine learning system may be adjusted. For example, the score 232 determined for the text summary 156 by the score generator 110 may be used to adjust the machine learning system 120 that generated the text summary 156 from the input document 154. The adjustments to the machine learning system 120 may be made in any suitable manner, for example, depending on the type and structure of the machine learning system 120 and any training or loss function used in the training of the machine learning system 120. For example, if the machine learning system 120 uses a neural network, the score 232 may be used as part of backpropagation function that adjust weights of the neural network used by the machine learning system 120.

Figure 6:
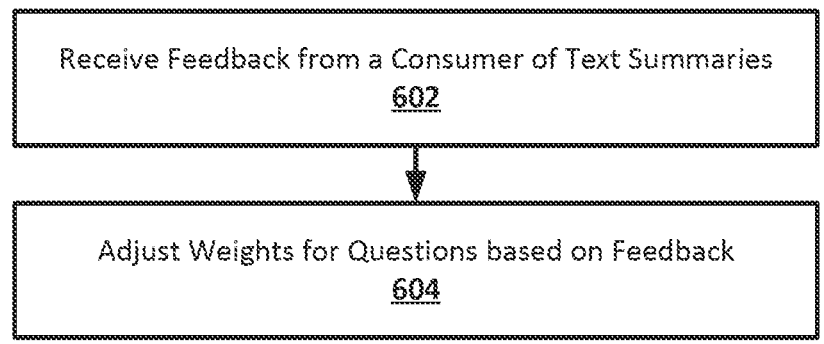
FIG. 6 shows an example procedure suitable for lossless summarization according to an implementation of the disclosed subject matter.

FIG. 6 shows an example procedure suitable for lossless summarization according to an implementation of the disclosed subject matter. At 602, feedback from a consumer of text summaries may be received, for example, at the computing device 100. For example, text summaries such as the text summary 156 generated by the machine learning system 120 may be provided to a consumer of text summaries after the machine learning system 120 is considered to have been successfully trained. The consumer may be, for example, an organization of any type that may be the source of input documents, such as the input documents, such as the input document 154, used as input to the machine learning system 120 during and/or after training of the machine learning system 120. The consumer of the text summaries may provide feedback on the text summaries. The feedback may indicate the quality of the text summaries as determined by the consumer in any suitable manner. The feedback for a text summary may be a score for the text summary on any suitable scale, or may be indications of which questions from the question set used during the training of the machine learning system 120, for example the question set 202, the text summary was not usable to answer correctly. The consumer may provide feedback in any suitable manner for any suitable number of text summaries.

At 604, weights for questions may be adjusted based on the feedback. For example, the computing device 100 may use the feedback from the consumer to make adjustments to the questions set weights 150 for the question set 202 used during the training of the machine learning system 120. Feedback indicating that the text summaries are of lower quality generally, or were unusable to answer more, and more important, questions from the question set 202, may indicate that that the question set weights 150 did not result in scores, such as the sore 232, that corresponded well to the actual quality of the text summaries generated by the machine learning system 120. The weights in the question set weights 150 may be adjusted in any suitable manner, using any suitable loss function or form of adjustment, including, for example, hill climbing or simulated annealing. After the question set weights 150 are adjusted based on feedback from consumers the machine learning system 120 may be re-trained using the now adjusted question set weights 150.

Figure 7:
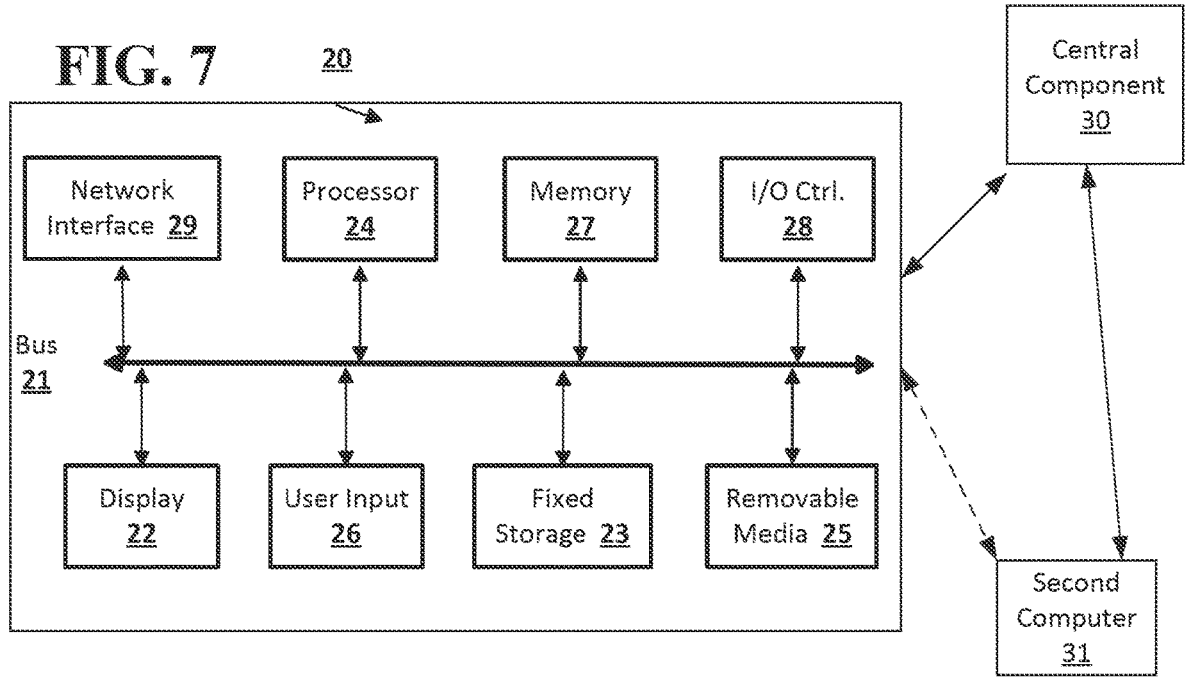
FIG. 7 shows a computer according to an implementation of the disclosed subject matter.

Implementations of the presently disclosed subject matter may be implemented in and used with a variety of component and network architectures. FIG. 7 is an example computer 20 suitable for implementing implementations of the presently disclosed subject matter. As discussed in further detail herein, the computer 20 may be a single computer in a network of multiple computers. As shown in FIG. 7, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 8.

Many other devices or components (not shown) may be connected in a similar manner (e.g., document scanners, digital cameras and so on). Conversely, all of the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 27, fixed storage 23, removable media 25, or on a remote storage location.

Figure 8:
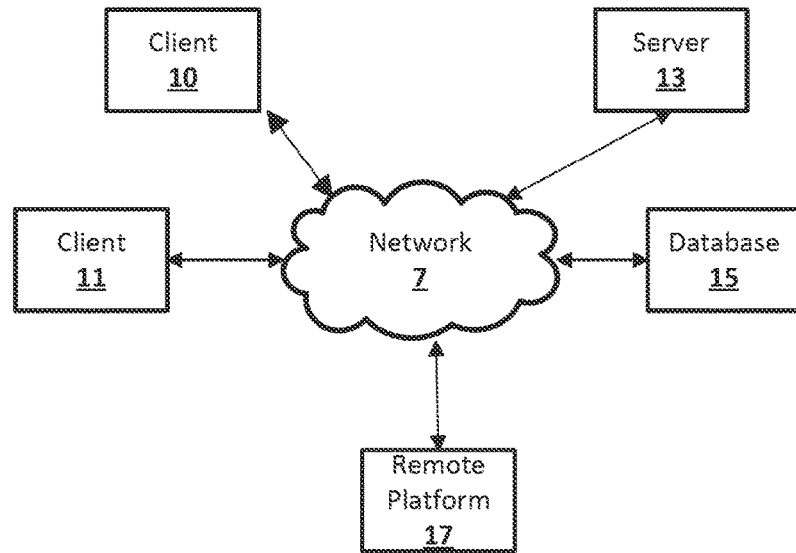
FIG. 8 shows a network configuration according to an implementation of the disclosed subject matter.

FIG. 8 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
   receiving, at a computing device, data comprising indications of whether a text summary generated by a machine learning system from an input document comprises correct answers to questions about the input document;
   receiving, by the computing device, weights associated with the questions about the input document;
   generating, by the computing device, a first vector from the indications in the data;
   generating, by the computing device, a second vector from the weights;
   determining, by the computing device, a dot product of the first vector and the second vector;
   determining, by the computing device, a ratio of a word count of the text summary to the word count of the input document;
   generating, by the computing device, a score for the text summary based on the dot product and the ratio and a brevity constant;
   adjusting, by the computing device, the machine learning system based on the score;
   receiving, by the computing device, an indication of the quality of additional text summaries generated by the machine learning system; and
   adjusting, by the computing device, the weights associated with the questions based on the indication of the quality of the additional text summaries.

2. The computer-implemented method of claim 1, further comprising:
receiving feedback about text summaries generated by the machine learning system from a consumer of the text summaries; and
adjusting the weights associated with the questions based on the feedback from the consumer of the text summaries.

3. The computer-implemented method of claim 1, wherein generating the score for the text summary based on the dot product and the ratio multiplied by a brevity constant comprises subtracting the ratio from one, multiplying by the brevity constant, and adding the dot product.

4. The computer-implemented method of claim 1, further comprising inputting the text summary and the questions to a second machine learning system to generate answers to the questions.

5. The computer-implemented method of claim 4, wherein generating the data comprising indications of whether the text summary generated by the machine learning system from the input document comprises correct answers to the questions about the input document further comprises inputting the answer generated by the second machine learning system to a third machine learning system to determine the correctness of the answers.

6. The computer-implemented method of claim 1, further comprising:
receiving, at the computing device, second data comprising indications of whether a second text summary generated by the machine learning system from a second input document comprises correct answers to the questions about the input document;
generating, by the computing device, a third vector from the indications in the second data;
determining, by the computing device, a second dot product of the third vector and the second vector;
determining, by the computing device, a second ratio of a word count of the second text summary to the word count of the second input document;
generating, by the computing device, a second score for the second text summary based on the second dot product and the second ratio; and
adjusting, by the computing device, the machine learning system based on the second score.

7. The computer-implemented method of claim 6, wherein the input document and the second input document originate from the same entity.

8. A computer-implemented system comprising:
a processor that receives data comprising indications of whether a text summary generated by a machine learning system from an input document comprises correct answers to questions about the input document,
receives weights associated with the questions about the input document,
generates a first vector from the indications in the data,
generates a second vector from the weights,
determines a dot product of the first vector and the second vector,
determines a ratio of a word count of the text summary to the word count of the input document,
generates a score for the text summary based on the dot product and the ratio and a brevity constant,
adjusts the machine learning system based on the score;
receives an indication of the quality of additional text summaries generated by the machine learning system, and
adjusts the weights associated with the questions based on the indication of the quality of the additional text summaries.

9. The computer-implemented system of claim 8, wherein the processor further receives feedback about text summaries generated by the machine learning system from a consumer of the text summaries, and
adjusts the weights associated with the questions based on the feedback from the consumer of the text summaries.

10. The computer-implemented system of claim 8, wherein the processor generates the score for the text summary based on the dot product and the ratio and a brevity constant by subtracting the ratio from one, multiplying by the brevity constant, and adding the dot product.

11. The computer-implemented system of claim 8, wherein the processor further inputs the text summary and the questions to a second machine learning system to generate answers to the questions.

12. The computer-implemented system of claim 11, wherein the processor generates the data comprising indications of whether the text summary generated by the machine learning system from the input document comprises correct answers to the questions about the input document by inputting the answer generated by the second machine learning system to a third machine learning system to determine the correctness of the answers.

13. The computer-implemented system of claim 8, wherein the processor further receives second data comprising indications of whether a second text summary generated by the machine learning system from a second input document comprises correct answers to the questions about the input document,
generates a third vector from the indications in the second data,
determines a second dot product of the third vector and the second vector,
determines a second ratio of a word count of the second text summary to the word count of the second input document,
generates a second score for the second text summary based on the second dot product and the second ratio, and
adjusts the machine learning system based on the second score.

14. The computer-implemented system of claim 13, wherein the input document and the second input document originate from the same entity.

15. A system comprising: one or more computers and one or more non-transitory storage devices storing instructions which are operable, when executed by the one or more computers, to cause the one or more computers to perform operations comprising:
receiving, at a computing device, data comprising indications of whether a text summary generated by a machine learning system from an input document comprises correct answers to questions about the input document;
receiving, by the computing device, weights associated with the questions about the input document;
generating, by the computing device, a first vector from the indications in the data;
generating, by the computing device, a second vector from the weights;
determining, by the computing device, a dot product of the first vector and the second vector;

determining, by the computing device, a ratio of a word count of the text summary to the word count of the input document;

generating, by the computing device, a score for the text summary based on the dot product and the ratio and a brevity constant;

adjusting, by the computing device, the machine learning system based on the score;

receiving, by the computing device, an indication of the quality of additional text summaries generated by the machine learning system; and adjusting, by the computing device, the weights associated with the questions based on the indication of the quality of the additional text summaries.

16. The system of claim 15, wherein the one or more computers and one or more non-transitory storage devices further store instructions which are operable, when executed by the one or more computers, to cause the one or more computers to further perform operations comprising:

receiving feedback about text summaries generated by the machine learning system from a consumer of the text summaries; and adjusting the weights associated with the questions based on the feedback from the consumer of the text summaries.

17. The system of claim 15, wherein the one or more computers and one or more non-transitory storage devices further store instructions which are operable, when executed by the one or more computers, to cause the one or more computers to perform the operation of generating the score for the text summary based on the dot product and the ratio and a brevity constant by subtracting the ratio from one, multiplying by the brevity constant, and adding the dot product.

18. The system of claim 15, wherein the one or more computers and one or more non-transitory storage devices further store instructions which are operable, when executed by the one or more computers, to cause the one or more computers to further perform operations comprising inputting the text summary and the questions to a second machine learning system to generate answers to the questions.

19. The system of claim 18, wherein the one or more computers and one or more non-transitory storage devices further store instructions which are operable, when executed by the one or more computers, to cause the one or more computers perform the operation of generating the data comprising indications of whether the text summary generated by the machine learning system from the input document comprises correct answers to the questions about the input document by inputting the answer generated by the second machine learning system to a third machine learning system to determine the correctness of the answers.

20. The system of claim 15, wherein the one or more computers and one or more non-transitory storage devices further store instructions which are operable when executed by the one or more computers, to cause the one or more computers perform the operations of:

receiving, at the computing device, second data comprising indications of whether a second text summary generated by the machine learning system from a second input document comprises correct answers to the questions about the input document;

generating, by the computing device, a third vector from the indications in the second data;

determining, by the computing device, a second dot product of the third vector and the second vector;

determining, by the computing device, a second ratio of a word count of the second text summary to the word count of the second input document;

generating, by the computing device, a second score for the second text summary based on the second dot product and the second ratio; and adjusting, by the computing device, the machine learning system based on the second score.

\* \* \* \* \*